March 31, 1964  C. KRAMER  3,127,603
RADAR BEACON FOR TRANSMITTING PULSE-MODULATED HIGH FREQUENCY
ENERGY UPON THE RECEPTION OF A RADAR SIGNAL
Filed Oct. 3, 1960

INVENTOR
CORNELIS KRAMER
BY
AGENT

United States Patent Office 3,127,603
Patented Mar. 31, 1964

3,127,603
RADAR BEACON FOR TRANSMITTING PULSE-MODULATED HIGH FREQUENCY ENERGY UPON THE RECEPTION OF A RADAR SIGNAL
Cornelis Kramer, Eindhoven, Netherlands, assignor to North American Philips Company, Inc., New York, N.Y., a corporation of Delaware
Filed Oct. 3, 1960, Ser. No. 60,028
Claims priority, application Netherlands Nov. 4, 1959
4 Claims. (Cl. 343—6.8)

This invention relates to radar beacons. A radar beacon is used in conjunction with a radar transceiving installation. In this case, the beacon receives pulse-modulated high-frequency energy from the radar transmitter.

Radar beacons are known comprising a local oscillator and a mixing stage for producing an intermediate-frequency signal and also a transmitting oscillator. After reception of a radar pulse, such beacons transmit a pulse or a series of pulses at the frequency of the radar transmitter.

Beacons of this kind are comparatively complicated, however, and also transportable with difficulty.

In addition, beacons are known having a receiver detecting directly and an oscillator which serves as a transmitter. The transmitting oscillator transmits high-frequency energy of a frequency equal to that of the radar pulses. After reception of a radar pulse, the transmission is interrupted for a short period. The transmitting oscillator of this beacon is, for example, a klystron.

Such beacons have the disadvantage that the receiver can receive radar pulses in a broad band of frequencies so that the beacon is liable to be interfered with by other radar transmitters. A further disadvantage is that the frequency stability of a klystron is low.

Beacons are also known comprising a local oscillator and a mixing stage for producing an intermediate-frequency signal, wherein the local oscillator is also used as a transmitter. In such beacons, the frequency of the local oscillator is varied periodically. After reception of a signal through the intermediate-frequency channel, the local oscillator is controlled at the moment when the frequency is equal to that of the incoming signal so that a stronger oscillation is produced during a short period and the oscillator transmits this oscillation.

The disadvantage of such a beacon as a radar beacon is that the frequency of the local oscillator can be varied only comparatively slowly, since a beacon receives only a comparatively small number of radar pulses during each revolution of the aerial of the radar transmitter. For this type of beacon, the risk of no radar pulse being received through the intermediate-frequency channel is then unduly great. Another disadvantage is that transmission of a pulse by the beacon in response to a received pulse is delayed, so that determination of the exact location of the beacon is more difficult. This results from the fact that a radar pulse is received by the beacon only when the sum or difference of the local oscillator frequency and the frequency of the radar pulse is equal to the intermediate frequency of the beacon, but transmission of a pulse by the beacon is delayed until the local oscillator frequency (which is continuously varying) has reached the frequency of the radar pulse.

An object of the invention is to provide a beacon comprising a local oscillator and a mixing stage for producing an intermediate-frequency signal, means being provided for periodically varying the frequency of the local oscillator, and wherein the said disadvantages of known beacons are avoided.

A radar beacon according to the invention is characterized by means which, upon reception of a radar pulse through the intermediate-frequency channel, make the said means for periodically varying the oscillator frequency inoperative for a certain period of time in order to maintain the frequency constant during this period and which, during a period which is smaller than the said certain period, also bring about a temporary variation in the frequency of the local oscillator by an amount equal to the intermediate frequency, the arrangement being such that the local oscillator transmits a pulse at the frequency of the radar pulse during the temporary variation in frequency.

In one preferred embodiment of the radar beacon, the local oscillator is connected through a magic T-circuit to both the input and the output of the beacon. This affords the advantage that a more complicated transmit-receive switch is not necessary and still energy can be received and transmitted by means of the same aerial.

In order that the invention may be readily carried into effect, one embodiment thereof will now be described in detail, by way of example, with reference to the accompanying diagrammatic drawing, in which.

Figure 1:
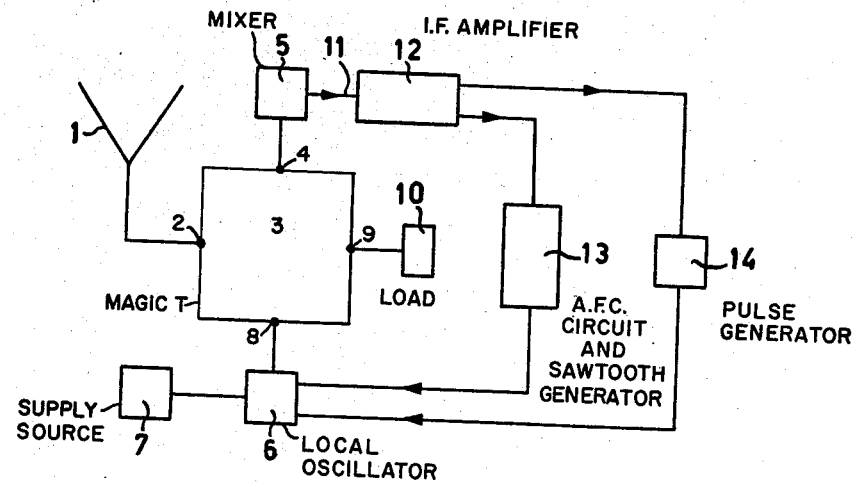
FIG. 1 shows one preferred embodiment of the radar beacon.

The radar beacon shown in FIG. 1 receives pulse-modulated high-frequency energy from a radar transceiving installation (not shown) by means of a combination 1 of a transmitting and a receiving aerial. This aerial, is, for example, a horn radiator of known type. The radar signals received are supplied from the aerial 1 to an input 2 of a magic T-circuit 3 shown diagrammatically.

A mixing stage 5 is connected to an input 4 of the magic T-circuit 3. The mixing stage 5 comprises, for example, a cavity resonator in which a crystal is housed in known manner.

The mixing stage 5 has supplied to it, on the one hand, a proportion of the radar signals received through the aerial 1 and, on the other hand, a signal from a local oscillator 6. This oscillator is, for example, a klystron. The klystron is fed from a supply device 7.

The klystron 6 supplies a signal to an input 8 of the magic T-circuit 3. A portion of this signal is led to the input 2 of the magic T-circuit 3 and transmitted through the aerial 1. Another portion of the klystron signal is led through the magic T-circuit to an input 9. The inputs 9 and 2 of the magic T-circuit 3 are associated with each other, that is to say that transmission between these inputs is impossible if the other inputs are loaded by a matched load. The inputs 4 and 8 are also associated with each other. The input 9 is closed by means of a load 10, for example a movable short-circuiting piston. The above-mentioned portion of the klystron signal is reflected by the short-circuiting piston and led through the magic T-circuit to the inputs 8 and 4. The signal is led from the input 4 further to the mixing stage 5.

At an output 11 of the mixing stage 5 there is set up a signal produced by mixing of the radar signals and the klystron signal. The signal component having a frequency equal to the difference between the klystron frequency and the frequency of the radar signals is amplified by an intermediate-frequency amplifier. The amplified signal is supplied to an automatic frequency-control circuit 13, which is, for example, of the type described in the book "Principles of Radar," J. F. Reintjes and G. T. Coate, Third edition, 1952, chapter 6, pages 458 to 461. The operation of control circuit 13, insofar as it is important in this connection, is as follows:

The control circuit 13 delivers a sawtooth voltage to the reflector of klystron 6, if radar pulses are not received by the beacon. The frequency of the klystron varies continuously by the action of this voltage.

Assuming that the klystron frequency is decreasing at a time when a radar pulse is received (the klystron frequency being higher than the frequency of the radar pulse) the difference frequency of the klystron oscillations and radar pulse will be decreasing. When this difference frequency has decreased to such an extent that it is less than the intermediate frequency of the amplifier 12, the output of the amplifier 12 energizes the control circuit 13 to deliver a voltage to the klystron for increasing the klystron frequency. When the klystron frequency has increased sufficiently that the difference frequency is greater than the intermediate frequency, the output of amplifier 12 energizes the control circuit to deliver a voltage to the klystron for decreasing the klystron frequency. In other words, the control circuit 13 functions as an automatic frequency control circuit for the klystron when a radar pulse is present, so that the control circuit 13 is responsive to the output of the amplifier 12 to maintain the klystron frequency substantially constant. The control circuit 13 may, for example, include a frequency sensitive circuit for determination of the frequency deviation of the output of the amplifier 12 from a predetermined frequency in the intermediate frequency band. When a subsequent radar pulse is received at a time when the difference frequency has become smaller than the intermediate frequency, the output of the amplifier 12 energizes the control circuit 13 to repeat the automatic frequency control cycle. In the absence of reception of radar pulses by the beacon, the amplifier ceases to energize the control circuit, and the control circuit applies a sawtooth waveform voltage to the klystron.

The intermediate-frequency amplifier 12 also delivers a signal to a pulse-producing circuit 14 which comprises, for example, a blocking oscillator which is started after reception of a pulse from the intermediate-frequency amplifier 12. For a certain period, the circuit 14 then supplies a pulsatory voltage to the reflector of klystron 6, as the result of which the frequency of the klystron temporarily varies. Subsequently, circuit 14 returns of its own accord to the rest position, and the control circuit 13 resumes control of the klystron frequency until another pulse is received from the pulse generator 14. In other words, when a pulse is generated by circuit 14 the voltage outputs of circuits 13 and 14 both control the klystron frequency, but when the pulse is released, the klystron is locked in frequency only by the control circuit.

The pulse-producing circuit 14 delivers a pulse to the klystron 6 immediately after the pulse from the intermediate frequency amplifier 12 has started the cycle of control circuit 13. The amplitude of the pulse is chosen to be such that the klystron frequency is shifted by an amount equal to the intermediate frequency in the direction of the frequency of the radar pulses, so that the local oscillator delivers a pulse to the antenna that has the same frequency as the radar pulses.

The radar transceiving installation transmitting the radar pulses receives not only the echo from the radar beacon itself or from the object on which the beacon is positioned, but also immediately after this echo pulse, another pulse which is transmitted by the beacon. The length of the last-mentioned pulse is preferably greater than the length of the radar pulse.

Figure 2:
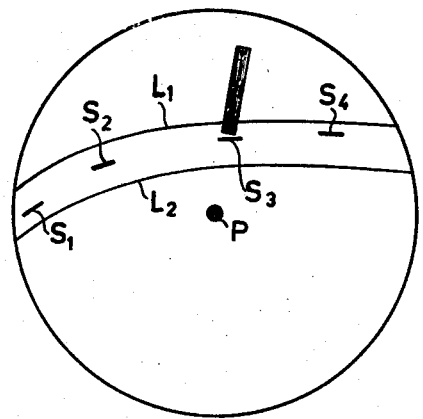
FIG. 2 shows a radar image on the screen of a radar installation co-operating with the beacon.

FIG. 2 shows diagrammatically the image on the screen of the picture tube of the radar receiving-installation when using a radar beacon according to the invention, it being assumed that the co-operating radar receiving-installation is of the type with a rotating aerial whereby the radar image is reproduced on a panorama screen. In this figure, $L_1$ and $L_2$ indicate the boundary lines of a given waterway, $S_1$ to $S_4$ indicate the image points of ships, and P indicates the position of the radar transceiving installation. The beacon is positioned on board the ship having the image point $S_3$. The radar installation transmits pulses which are received by the beacon. The beacon then returns a pulse of a greater length so that a luminescent piece of line is produced behind the image point $S_3$. The operator of the radar transceiving installation can now observe on which ship the beacon has been made operative.

The invention is not limited to a beacon which, after each incoming pulse, produces a single pulse of only a greater length. It is alternatively possible for the pulse-producing circuit 14 to be designed in a manner otherwise known so that, after an incoming pulse, this circuit produces a plurality of pulses which together form a certain code which is characteristic of a certain beacon.

What is claimed is:

1. A radar beacon for transmitting pulse-modified high frequency energy upon the reception of a radar signal, said beacon comprising a source of oscillations, means for mixing said oscillations and radar signal to produce an intermediate frequency signal, means responsive to said intermediate frequency signal connected to said oscillator for maintaining the frequency of said intermediate frequency signal substantially constant by controlling the frequency of said oscillations when a radar signal is received, and for periodically varying the frequency of said oscillations in the absence of said radar signal, means responsive to said intermediate frequency signal for shifting the frequency of said oscillator substantially to the frequency of said radar signal for a predetermined period subsequent the reception of a radar signal, and means for transmitting said oscillations.

2. A radar beacon for transmitting pulse-modulated high frequency energy upon the reception of a radar signal, said beacon comprising a source of oscillations, means for mixing said oscillations and said radar signal to produce an intermediate frequency signal, means responsive to said intermediate frequency signal when it is of a predetermined frequency for maintaining the frequency of said oscillator substantially constant, and for periodically varying the frequency of said oscillator when said intermediate frequency signal substantially differs from said predetermined frequency, means responsive to said intermediate frequency signal of said predetermined frequency for shifting the frequency of said oscillator by an amount equal to said predetermined frequency toward the frequency of said radar signal for a predetermined time subsequent the reception of a radar signal, and means for transmitting said oscillations.

3. A radar beacon for transmitting pulse-modulated high frequency energy upon the reception of a radar signal, said beacon comprising a source of oscillations, mixing means, antenna means, means for coupling said source and antenna means to said mixing means and for coupling said oscillator to said antenna means, whereby radar signals intercepted by said antenna means are mixed with said oscillations in said mixing means to produce an intermediate frequency signal and said oscillations are applied to said antenna means, and first and second means responsive to said intermediate frequency signals when they are of a predetermined frequency for controlling the frequency of said oscillations, said first means being arranged to substantially maintain the frequency of said oscillations when radar signals are received and to periodically vary the frequency of said oscillations when radar signals are absent, said second means being arranged to shift the frequency of said oscillations toward the frequency of said radar signals by an amount substantially equal to said predetermined frequency for a predetermined time subsequent the reception of said radar signal, whereby a pulsatory signal of the frequency of said radar signal is transmitted for a predetermined time subsequent the reception of each radar signal.

4. The beacon of claim 3, in which said coupling means is a magic T circuit.

No references cited.